US010363984B2

(12) United States Patent
Matsuo et al.

(10) Patent No.: US 10,363,984 B2
(45) Date of Patent: Jul. 30, 2019

(54) BODY COVER STRUCTURE FOR SADDLE RIDING VEHICLE

(71) Applicant: HONDA MOTOR CO., LTD., Minato-ku, Tokyo (JP)

(72) Inventors: Tomoya Matsuo, Wako (JP); Yuji Noguchi, Wako (JP); Masanobu Nagasaki, Maibara (JP)

(73) Assignee: Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 15/698,235

(22) Filed: Sep. 7, 2017

(65) Prior Publication Data
US 2018/0072364 A1 Mar. 15, 2018

(30) Foreign Application Priority Data

Sep. 9, 2016 (JP) ................. 2016-177145

(51) Int. Cl.
*B62J 17/00* (2006.01)
*B62D 29/04* (2006.01)
*B62K 11/04* (2006.01)
*B62D 25/02* (2006.01)
*B62D 25/08* (2006.01)

(52) U.S. Cl.
CPC ............. *B62J 17/00* (2013.01); *B62D 29/04* (2013.01); *B62K 11/04* (2013.01); *B62D 25/02* (2013.01); *B62D 25/084* (2013.01)

(58) Field of Classification Search
CPC .......... B62J 17/00; B62K 11/04; B62D 29/04; B62D 25/02; B62D 25/084
USPC ................... 296/78.1, 181.1, 181.2
See application file for complete search history.

(56) References Cited

U.S. PATENT DOCUMENTS

| | | | | |
|---|---|---|---|---|
| 4,618,020 A | * | 10/1986 | Noda | B62J 17/00 180/229 |
| 5,036,947 A | * | 8/1991 | Metzger | F01N 13/14 181/211 |
| 7,946,380 B2 | * | 5/2011 | Yamamoto | F01N 13/14 181/204 |
| 9,803,522 B2 | * | 10/2017 | Kinoshita | F01N 1/24 |

(Continued)

FOREIGN PATENT DOCUMENTS

| | | |
|---|---|---|
| EP | 2 436 582 A1 | 4/2012 |
| JP | 2005-344552 A | 12/2005 |
| JP | 2013-018358 A | 1/2013 |

OTHER PUBLICATIONS

Extended European search report dated Jan. 17, 2018 issued to the corresponding patent application EP 17189801.8.

(Continued)

*Primary Examiner* — Jason S Morrow
*Assistant Examiner* — E Turner Hicks
(74) *Attorney, Agent, or Firm* — Carrier Blackman & Associates, P.C.; William D. Blackman; Joseph P. Carrier

(57) ABSTRACT

Inside a radiator shroud covering an outside of an engine or an outside of a radiator supposed to get hot relating to the engine, a first protruding portion and a second protruding portion are provided. An abutting surface to abut on the engine or the radiator is provided at a distal end of each of the first protruding portion and the second protruding portion. The first protruding portion and the second protruding portion are made of resin material with higher heat resistance than a shroud body of the radiator shroud.

12 Claims, 11 Drawing Sheets

(56) References Cited

U.S. PATENT DOCUMENTS

| | | | |
|---|---|---|---|
| 2004/0216453 A1* | 11/2004 | Oshima | F01N 13/08 60/322 |
| 2006/0042871 A1* | 3/2006 | Yasuda | F01N 1/24 181/227 |
| 2013/0015008 A1 | 1/2013 | Yama et al. | |
| 2013/0068554 A1* | 3/2013 | Hayama | F01N 13/14 181/228 |

OTHER PUBLICATIONS

European Office Action issued in the corresponding EP Patent Application No. 17 189 801.8 dated Apr. 17, 2019.

* cited by examiner

FIG.8
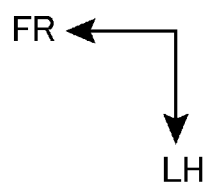
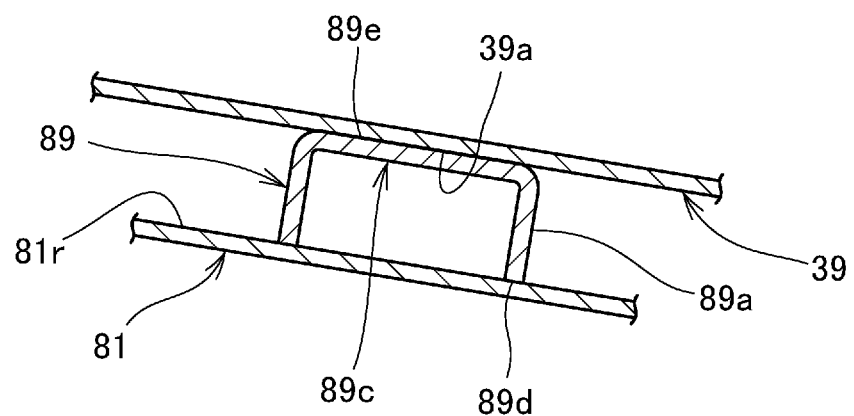

BODY COVER STRUCTURE FOR SADDLE RIDING VEHICLE

The present application claims priority under 35 U.S.C. § 119 to Japanese Patent Application No. 2016-177145 filed on Sep. 9, 2016. The content of the application is incorporated herein by reference in its entirety.

TECHNICAL FIELD

The present invention relates to a body cover structure for a saddle riding vehicle.

BACKGROUND ART

Conventionally, a body cover structure in which a rib abutting on a radiator is formed on an inner surface of a shroud for covering the radiator laterally is known (for example, see Patent Literature 1).

CITATION LIST

Patent Literature

[Patent Literature 1] JP-A No. 2013-18358

SUMMARY OF INVENTION

Technical Problem

In the structure described in Patent Literature 1, a pair of ribs abutting on the radiator protrude from the inner surface of the shroud, and when the ribs contact the radiator supposed to get hot, there is a concern about thermal influence on the ribs. Furthermore, since the distal end of each rib is pointed, the surface pressure generated at the distal end of each rib increases, making it more likely to cause deformation or abrasion of the rib.

The present invention has been achieved in view of the above-mentioned circumstances, and it is an object thereof to provide a body cover structure for a saddle riding vehicle which can suppress thermal influence on a component abutting on an engine or a component supposed to get hot relating to the engine and deformation or abrasion of the component, in a body cover.

Solution to Problem

In order to achieve the object, according to a first feature of an aspect of the present invention, there is provided a body cover structure for a saddle riding vehicle which includes a body cover (50, 51, 201) made of fiber-reinforced resin for covering an outside of a vehicle body. A protruding portion (66, 67, 89, 202) is provided inside the body cover (50, 51, 201) covering an outside of an engine (10) or a component (38, 39, 41) supposed to get hot, the component (38, 39, 41) relating to the engine (10). An abutting surface (66e, 89e, 202g) to abut on the engine (10) or the component (38, 39, 41) is provided at a distal end of the protruding portion (66, 67, 89, 202). The protruding portion (66, 67, 89, 202) is made of resin material with higher heat resistance than a cover body (56, 81) constituting the body cover (50, 51, 201).

According to a second feature of the present invention, in addition to the first feature, the protruding portion (66, 67, 89) may have a hollow structure formed by an outer peripheral wall (66a, 89a) erected from the cover body (56, 81) of the body cover (50, 51) and an inner wall (66c, 89c) provided at a top of the outer peripheral wall (66a, 89a), and the abutting surface (66e, 89e) may be formed on the inner wall (66c, 89c).

According to a third feature of the present invention, in addition to the first or second feature, the body cover may be a radiator shroud (50) for covering an outside of a radiator (41) and the protruding portion (66, 67) may abut on an outside surface of the radiator (41).

According to a fourth feature of the present invention, in addition to the first or second feature, the body cover may be a side cover (51) located under a lateral portion of a seat (13), covering an outside of a muffler (38, 39), and the protruding portion (89) may abut on an outside surface of the muffler (38, 39).

According to a fifth feature of the present invention, in addition to any one of the first to fourth features, the protruding portion (66, 67) may be made of fiber-reinforced resin and fiber of the protruding portion (66, 67) may have higher strength and higher heat resistance than fiber of a resin member (56) of the body cover (50).

According to a sixth feature of the present invention, in addition to the fifth feature, the fiber of the resin member (56) of the body cover (50) may be carbon fiber and the fiber of the protruding portion (66, 67) may be Kevlar fiber.

According to a seventh feature of the present invention, there is provided a body cover structure for a saddle riding vehicle which includes a body cover (50, 51, 201) made of fiber-reinforced resin for covering an outside of a vehicle body. A protruding portion (66, 67, 89, 202) is provided inside the body cover (50, 51, 201) covering an outside of an engine (10) or a component (38, 39, 41) supposed to get hot, the component (38, 39, 41) relating to the engine (10). The protruding portion (66, 67, 89, 202) is configured as a separate component from a cover body (56, 81) constituting the body cover (50, 51, 201) and the protruding portion (66, 67, 89, 202) is made of resin material with high heat resistance. An abutting portion (66e, 89e, 202g) to directly abut on the engine (10) or the component (38, 39, 41) is provided at a distal end of the protruding portion (66, 67, 89, 202).

Advantageous Effects of Invention

With the first feature of an aspect of the present invention, the protruding portion can have high heat resistance and due to the presence of the abutting surface on the protruding portion, the surface pressure generated on the abutting surface can be decreased. Consequently, thermal influence on the protruding portion or deformation or abrasion of the protruding portion can be suppressed.

With the second feature, the protruding portion can be light and highly rigid and highly heat-resistant. Consequently, the body cover can be light and if an external force is applied to the body cover, deformation of the protruding portion can be suppressed and further the protruding portion is less susceptible to thermal influence.

With the third feature, even if the protruding portion of the radiator shroud contacts the outside surface of the hot radiator, it can resist the high temperature of the radiator.

With the fourth feature, even if the protruding portion of the side cover contacts the outside surface of the hot muffler, it can resist the high temperature of the muffler.

With the fifth and sixth features, the protruding portion can have higher strength and thermal influence on it can be further suppressed.

With the seventh feature, the protruding portion can be highly heat-resistant and due to the presence of the abutting portion to abut on the protruding portion directly, it is only necessary to increase the heat resistance of the protruding portion and thus the structure can be simple and compact.

BRIEF DESCRIPTION OF DRAWINGS

FIG. 8 is a sectional view taken along the line of FIG. 6.

DESCRIPTION OF EMBODIMENTS

Figure 1:
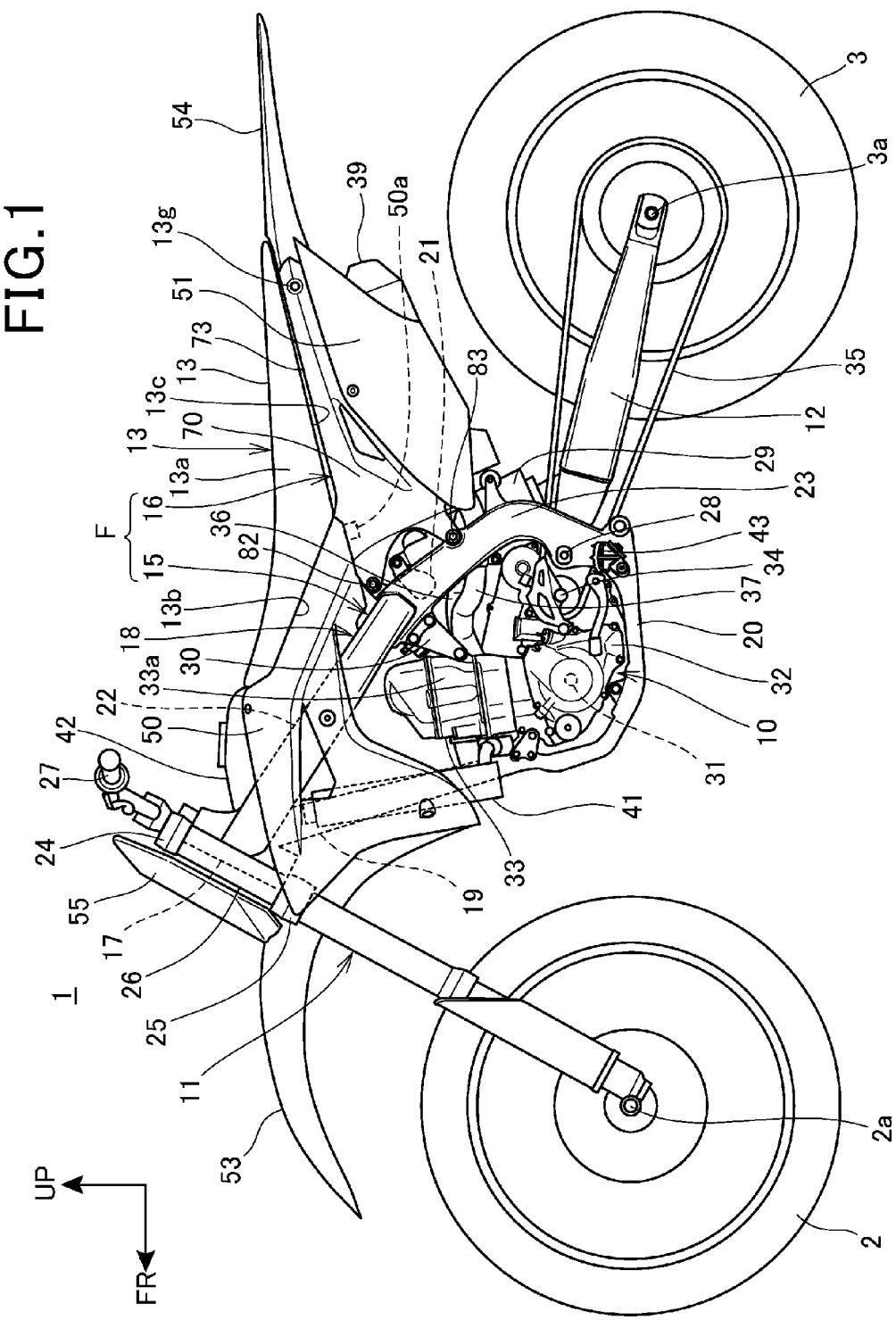
FIG. 1 is a left side view of a motorcycle according to an embodiment of the present invention.

Next, an embodiment of the present invention will be described referring to drawings. In the description, expressions related to directions, such as front/rear, left/right, up/down, and upper/lower or above/under, denote the same directions as directions with respect to the vehicle body unless otherwise specified. In the drawings, reference sign FR denotes the forward direction of the vehicle body, reference sign UP denotes the upward direction of the body, and reference sign LH denotes the leftward direction of the vehicle body.

Figure 2:
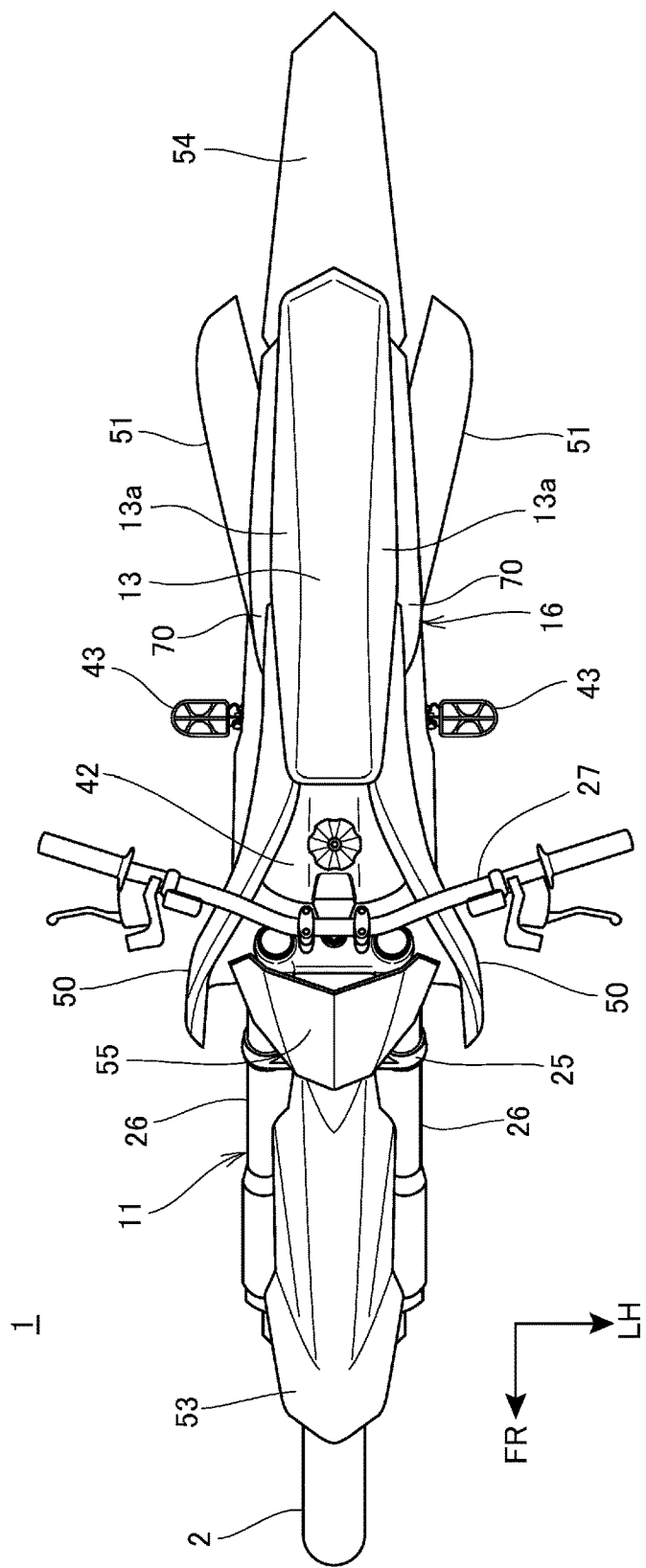
FIG. 2 is a plan view of the motorcycle.

FIG. 1 is a left side view of a motorcycle 1 according to the embodiment of the invention. FIG. 2 is a plan view of the motorcycle 1. In FIG. 1, regarding elements provided as a pair at the right and left, only the left element accompanied by a reference sign for the element is shown.

The motorcycle 1 is a vehicle in which an engine 10 as a power unit is supported on a body frame F, a front fork 11 steerably supporting a front wheel 2 is steerably supported on a front end of the body frame F, and a rear fork 12 supporting a rear wheel 3 is provided on a rear side of the body frame F. The motorcycle 1 is a saddle riding vehicle with a seat 13 located above a rear portion of the body frame F, in which a rider is seated in a manner to straddle the seat 13.

The body frame F includes a front frame 15 for supporting the engine 10 as an internal combustion engine and a rear frame 16 extending rearward of the front frame 15.

The front frame 15 includes; a head pipe 17 provided at a front end; a pair of left and right main frames 18, 18; a down frame 19; a pair of left and right lower frames 20, 20; and a cross frame 21 connecting the main frames 18, 18 in a vehicle width direction. The front frame 15 is made of a metal such as aluminum alloy and has electrical conductivity.

Specifically, the main frames 18, 18 integrally include a pair of left and right main tubes 22 extending rearward and downward from a rear surface of the head pipe 17 and a pair of pivot frames 23, 23 extending rearward and downward from rear ends of the main tubes 22, 22 with a sharper inclination angle than the main tubes 22, 22. The main frames 18, 18 extend rearward and downward at their front end portions in a manner that the distance between them in the vehicle width direction increases and they extend rearward and downward at their rear portions in a manner to be parallel to each other.

The down frame 19 has an upper end portion connected to a rear portion of the head pipe 17 and front end portions of the main frames 18, 18 under the main frames 18, 18, and the down frame 19 extends rearward and downward with a shaper inclination angle than the main frames 18, 18. The down frame 19 is a single frame which extends in the center in the vehicle width direction.

The pivot frames 23, 23 extend downward from rear ends of the main tubes 22, 22 with a larger rearward inclination angle than the main tubes 22, 22. The cross frame 21 connects upper end portions of the pivot frames 23, 23 in the vehicle width direction.

The lower frames 20, 20, separated to the left and right at the lower end portion of the down frame 19, each extend downward, then curve rearward and join the lower end portions of the pivot frames 23, 23.

The rear frame 16 has a front end portion connected to rear portions of the main frames 18, 18 and extends rearward.

The front fork 11 includes: a steering shaft (not shown) journaled to the head pipe 17; a top bridge 24 fixed on an upper end of the steering shaft; a bottom bridge 25 fixed on a lower end of the steering shaft; and a pair of fork tubes 26 located left and right of the head pipe 17 and supported by the top bridge 24 and the bottom bridge 25.

The front wheel 2 is journaled to a front wheel axle 2a provided at lower end portions of the fork tubes 26, 26. A handlebar 27 used by a rider to steer the front wheel 2 is attached to the top bridge 24.

The rear fork 12 in the shape of an arm, extending rearward, has a front end portion journaled to a pivot shaft 28 for connecting the rear end portions of the left and right pivot frames 23, 23 in the vehicle width direction, and the rear fork 12 swings vertically around the pivot shaft 28. The rear wheel 3 is journaled to a rear wheel axle 3a inserted into a rear end portion of the rear fork 12.

A rear suspension 29 is stretched between a front portion of the rear fork 12 and the cross frame 21.

The engine 10 is located inside the front frame 15 shaped like a frame in side view and supported by the front frame 15. An engine hanger 30 extending forward and downward is fixed on vertically middle portions of the main frames 18, 18.

The engine 10 includes a crankcase 32 supporting a crankshaft 31 extending in the vehicle width direction, and a cylinder portion 33 extending upward from a front portion of the crankcase 32. The rear portion of the crankcase 32 houses a transmission (not shown). The engine 10 is of the water-cooled type.

The front end portion of the engine hanger 30 is connected to a rear portion of a cylinder head 33a of the cylinder portion 33.

Output of the engine 10 is transmitted to the rear wheel 3 by a chain 35 wound between an output shaft 34 of the transmission of the engine 10 and the rear wheel 3.

An exhaust pipe of the engine 10, drawn forward from an exhaust port on a front surface of the cylinder head 33a, extends toward one direction (right) in the vehicle width direction, then curves rearward, passes on the right side of the cylinder portion 33 and extends rearward, then branches into one side exhaust pipe 36 on the right and the other side exhaust pipe 37 on the left behind the cylinder portion 33. The one side exhaust pipe 36 (see FIG. 4) passes on the right side of the vehicle body, extending rearward and is connected to one side muffler 38 (see FIG. 7). The other side exhaust pipe 37 passes on the left side of the vehicle body, extending rearward and is connected to the other side muffler 39. The one side muffler 38 and the other side muffler 39 are separately located left and right of the rear wheel 3 above the rear wheel 3.

The motorcycle 1 includes a pair of left and right plate-like radiators 41, 41 which radiate heat of cooling water in the engine 10. The radiators 41, 41 are located separately on the left and right sides of the down frame 19 in front of the cylinder portion 33. The radiators 41, 41 are located upright in a manner that their heat radiating surfaces, as surfaces in their plate thickness direction, face forward of the motorcycle 1.

A fuel tank 42 is located between the head pipe 17 and a seat 13 and between the left and right main frames 18, 18 and the fuel tank 42 is supported by the main frames 18, 18. An upper portion of the fuel tank 42 expands upward from upper surfaces of the main frames 18, 18.

The seat 13 extends rearward from a rear portion of the fuel tank 42 along an upper surface of the rear frame 16. The seat 13 is supported from under by the fuel tank 42 and the rear frame 16.

A pair of left and right steps 43, 43 on which the rider puts his/her feet are provided at lower end portions of the pivot frames 23, 23.

The motorcycle 1 includes a pair of left and right radiator shrouds 50, 50 and a pair of left and right side covers 51, 51 as body covers covering the vehicle body.

The radiator shrouds 50, 50 are plate-like covers which cover the radiators 41, 41, an upper portion of the down frame 19, main tubes 22, 22, and the fuel tank 42 from outside. The radiator shrouds 50, 50 are fixed on the radiators 41, 41, the main tubes 22, and the fuel tank 42 with fixing tools.

The side covers 51, 51 cover the one side muffler 38 and the other side muffler 39 from outside respectively. The side covers 51, 51 are attached to outside surfaces of the rear frame 16.

The radiator shrouds 50, 50 and the side covers 51, 51 are made of fiber-reinforced resin.

As shown in FIGS. 1 and 2, both side surfaces 13a, 13a of the seat 13 in the vehicle width direction are inclined so that the size of the seat 13 in the vehicle width direction increases toward the downward direction. The both side surfaces 13a, 13a are smoothly continuous with outside surfaces of rear portions of the radiator shrouds 50, 50 and outside surfaces of the rear frame 16. Therefore, the rider seated on the seat 13 is prevented from getting stuck with a stepped portion and the rider can easily change the riding position.

Furthermore, the motorcycle 1 includes a front fender 53 attached to the front fork 11 to cover the front wheel 2 from above, a rear fender 54 covering the rear wheel 3 from above, and a front cover 55 covering upper portions of the fork tubes 26, 26 from ahead.

The front fender 53 and the front cover 55 are made of resin such as polypropylene.

Figure 3:
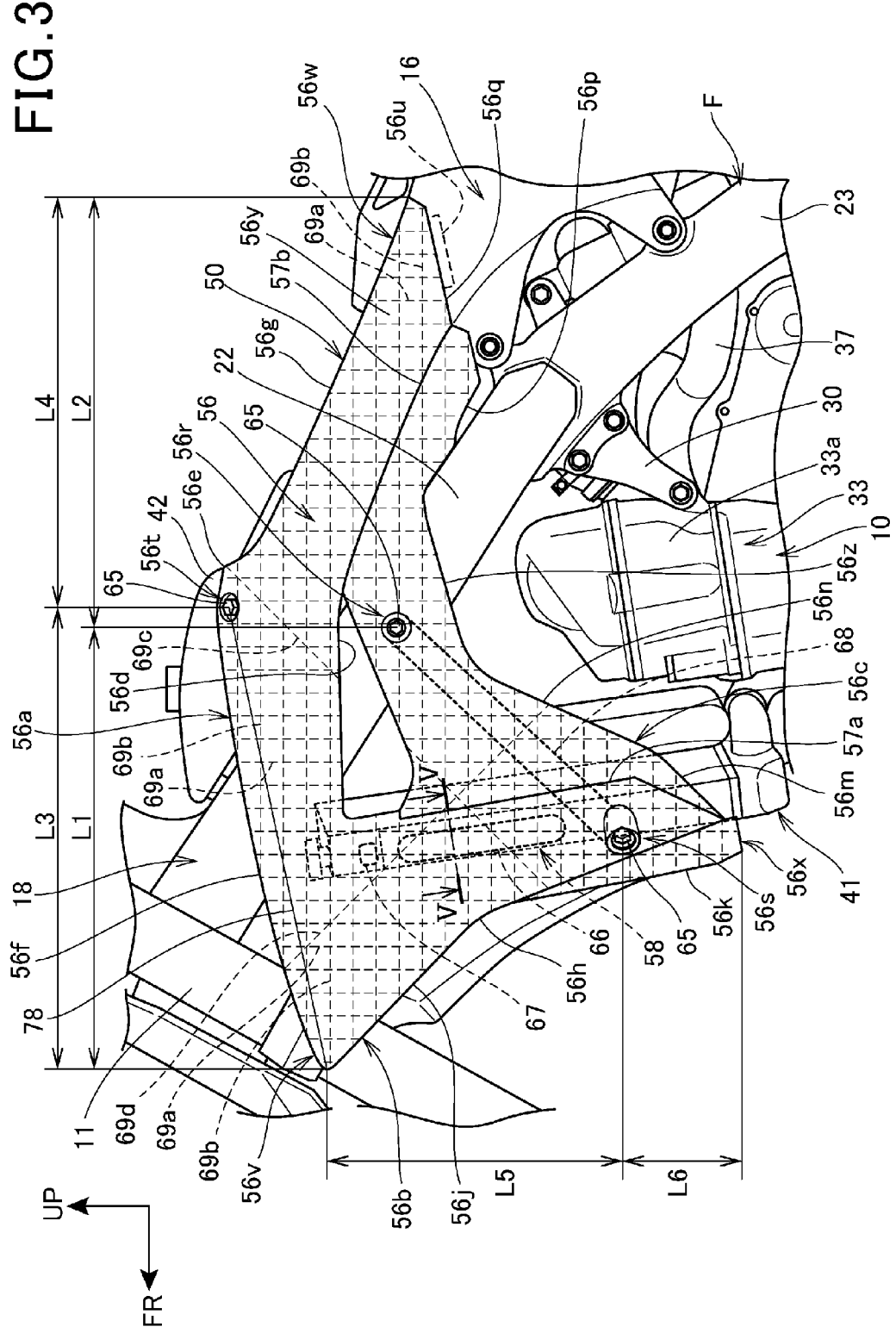
FIG. 3 is an enlarged view of an essential part of FIG. 1.

FIG. 3 is an enlarged view of an essential part of FIG. 1.

The radiator shroud 50, attached to the main frame 18, rear frame 16, radiator 41, and fuel tank 42, covers the main frame 18, rear frame 16, radiator 41, and fuel tank 42 laterally.

The radiator shroud 50 includes a shroud body 56 and a protruding portion 58 joined to a rear surface of the shroud body 56 by adhesive bonding.

The shroud body 56 takes a nearly triangular form having an upper side 56a, a front side 56b, and a lower side 56c in side view, and a center opening 56d is made in a nearly central portion of the triangle. The upper side 56a has an upper side curved portion 56e protruding upward in its center and includes a front upper side 56f extending forward and downward from the upper side curved portion 56e and a rear upper side 56g extending rearward and downward from the upper side curved portion 56e.

The front side 56b has a front side curved portion 56h curved in a concave manner in its center and includes an upper front side 56j extending upward from the front side curved portion 56h and a lower front side 56k extending downward from the front side curved portion 56h. The lower side 56c includes a front lower side 56m, a center first lower side 56n, a center second lower side 56z, a rear first lower side 56p, and a rear second lower side 56q. The front lower side 56m extends rearward and upward. The center first lower side 56n extends rearward and upward from a rear end of the front lower side 56m with a smaller angle than the front lower side 56m. The center second lower side 56z extends rearward and upward from a rear end of the center first lower side 56n with a smaller angle than the center first lower side 56n. The rear first lower side 56p extends rearward and downward from a rear end of the center second lower side 56z. The rear second lower side 56q extends rearward and upward from the rear first lower side 56p.

In the shroud body 56, a first fitting portion 56r is formed between the center opening 56d and the center second lower side 56z, a second fitting portion 56s is formed behind the lower front side 56k, and a third fitting portion 56t is formed under the upper side curved portion 56e. The first fitting portion 56r, the second fitting portion 56s, and the third fitting portion 56t are fitted to a longitudinally central portion of the main frame 18, a lower portion of the radiator 41, and an upper portion of the fuel tank 42 with bolts 65 respectively. An engaging convex portion 56u protruding downward is formed on the rear second lower side 56q of the shroud body 56 and the engaging convex portion 56u is inserted in a slit (not shown) made in the front portion of the rear frame 16 and engaged.

A front end portion 56v of the shroud body 56 is a free end which is not fixed on the vehicle body and is located outwardly away from the front fork 11.

Distance L1 from the first fitting portion 56r to the front end portion 56v in the longitudinal direction is almost equal to distance L2 from the first fitting portion 56r to a rear end portion 56w in the longitudinal direction.

Distance L3 from the third fitting portion 56t to the front end portion 56v in the longitudinal direction is almost equal to distance L4 from the third fitting portion 56t to the rear end portion 56w in the longitudinal direction.

Distance L5 from the second fitting portion 56s to the front end portion 56v in the vertical direction is longer than distance L6 from the second fitting portion 56s to a lower end portion 56x in the vertical direction. The relations of L1>L5 and L3>L5 hold.

Thus, the front end portion 56v of the shroud body 56 is largely forwardly away from the first fitting portion 56r and the second fitting portion 56s and largely upwardly away from the third fitting portion 56t, so if an external force is applied to a portion of the shroud body 56 forward of the first fitting portion 56*r* and the second fitting portion 56*s* and upward of the third fitting portion 56*t*, the shroud body 56 easily warps.

The protruding portion 58 includes a first protruding portion 66 and a second protruding portion 67 as protruding portions in contact with a side surface of the radiator 41, and a third protruding portion 68 connecting the first fitting portion 56*r* and the second fitting portion 56*s*.

The first protruding portion 66 and the second protruding portion 67 are located in a manner to overlap the radiator 41 in side view. The first protruding portion 66 is vertically long, extending along the side surface of the radiator 41 and the second protruding portion 67 is rectangular and located above the first protruding portion 66.

The third protruding portion 68 extends long rearward and upward and has a function for reinforcement between the first fitting portion 56*r* and second fitting portion 56*s* of the shroud body 56.

Although the shroud body 56 is a monolithic component, convex or concave lines 57*a* and 57*b* are formed on a front surface 56*y* from a front end of the center opening 56*d* to the lower end portion 56*x* of the shroud body 56 and from a rear end of the center opening 56*d* to the rear second lower side 56*q*. Consequently, the shroud body 56 can have a novel design to improve the attractiveness of the motorcycle 1 as a product. If the lines 57*a* and 57*b* are convex, the lines 57*a* and 57*b* can serve as reinforcing ribs to increase the rigidity of the shroud body 56.

The shroud body 56 is made of fiber-reinforced resin (FRP), for example, carbon fiber-reinforced resin (CFRP).

CFRP is a composite material which includes carbon fiber and resin. For example, it is produced by impregnating cloth 69 (see FIG. 9) with resin and heating and hardening it, in which the cloth 69 is woven with warp thread and weft thread made by bunching carbon fiber. As the resin, thermoplastic resins such as nylon (PA) and polypropylene (PP) or thermosetting resins such as epoxy and polyimide are suitable.

The fiber-reinforced resin is not limited to CFRP, but instead FRP (fiber-reinforced resin) which uses another kind of fiber may be used.

In the shroud body 56, broken lines extending longitudinally and vertically represent warp thread 69*a* and weft thread 69*b* which are made of carbon fiber. Bisectors 69*c* and 69*d* which bisect the angle between the warp thread 69*a* and the weft thread 69*b* are expressed by broken lines.

Figure 4:
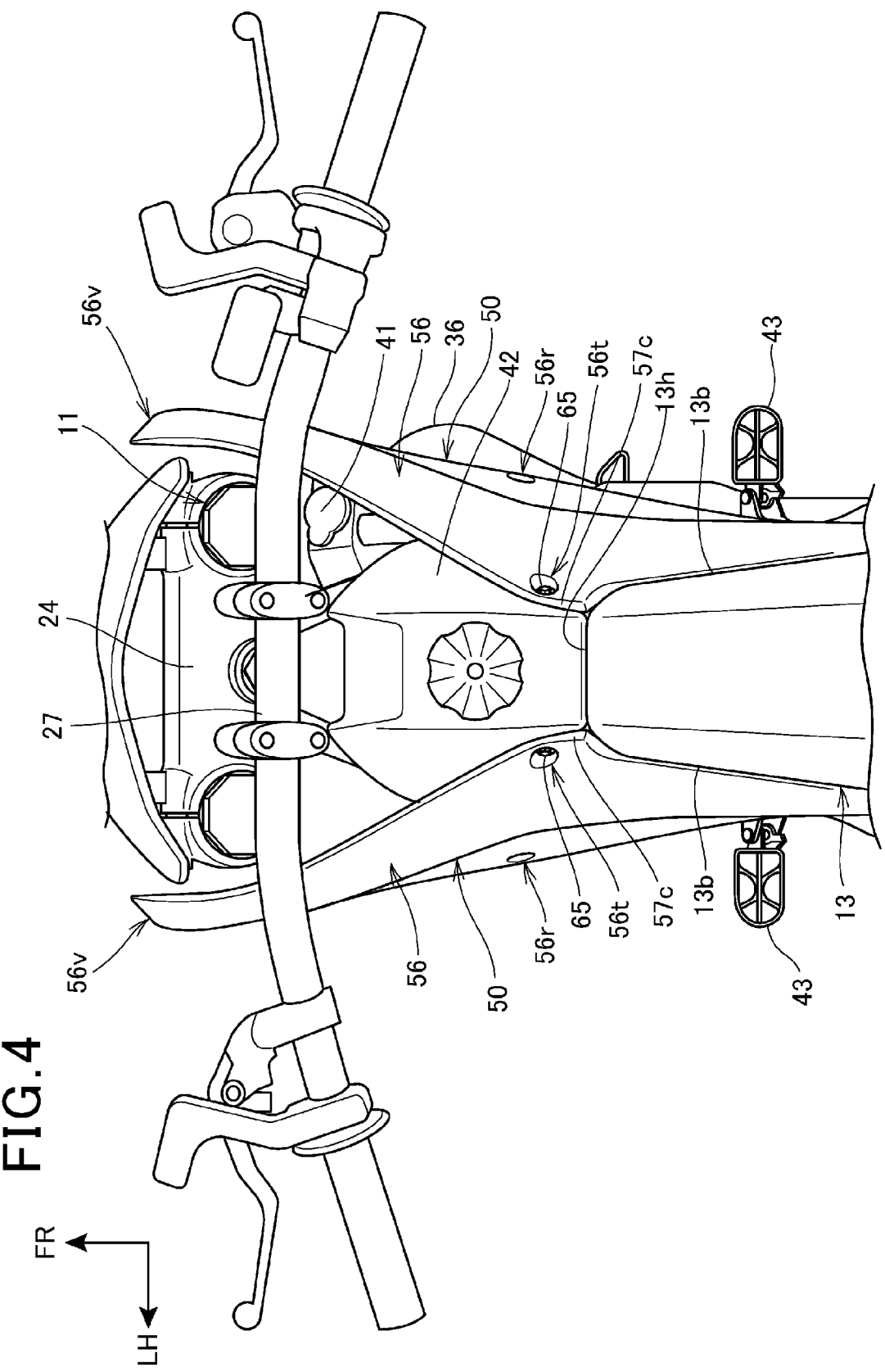
FIG. 4 is a plan view which shows a front portion of the motorcycle.

FIG. 4 is a pan view of an essential part of the front portion of the motorcycle 1.

The left and right radiator shrouds 50, 50 laterally cover lower portions of the seat 13 on both sides, and the upper portions of the fuel tank 42 and front fork 11. The rear portions of the left and right radiator shrouds 50, 50 extend almost in the longitudinal direction outward of the seat 13 and the left and right radiator shrouds 50, 50 gradually expand outward in the vehicle width direction toward the direction from the rear portions of the radiator shrouds 50, 50 to the front of the vehicle. Specifically, an upper edge 57*c* of the shroud body 56 is formed along a front lower edge 13*b* of the seat 13 laterally to the seat 13 and extends along a portion of a front edge 13*h* of the seat 13 from the front lower edge 13*b* of the seat 13, then the upper edge 57*c* gradually shifts outward in the vehicle width direction as the front of the vehicle approaches.

The front end portions 56*v*, 56*v* of the left and right radiator shrouds 50, 50 extend to outward positions away from the front fork 11 in the vehicle width direction. In other words, in the radiator shrouds 50, 50, the front end portions 56*v*, 56*v* are located in outermost positions in the vehicle width direction and thus an external force is likely to be repeatedly applied to the front end portions 56*v*, 56*v* of the radiator shrouds 50 from lateral sides of the vehicle.

The first fitting portion 56*r* and third fitting portion 56*t* of the shroud body 56 are located laterally to the fuel tank 42 in plan view. The area around the first fitting portion 56*r* and third fitting portion 56*t* of the shroud body 56 is an area to be pinched by a leg of the rider, so the amount of its lateral protrusion is small and its rigidity is high.

In this embodiment, the shroud body 56 is made of FRP, for example, CFRP and as mentioned above, its strength is increased in case that an external force is repeatedly applied to the front end portion 56*v* of the shroud body 56, and further its durability is improved by making it warp easily in consideration of the fiber direction.

Figure 5:
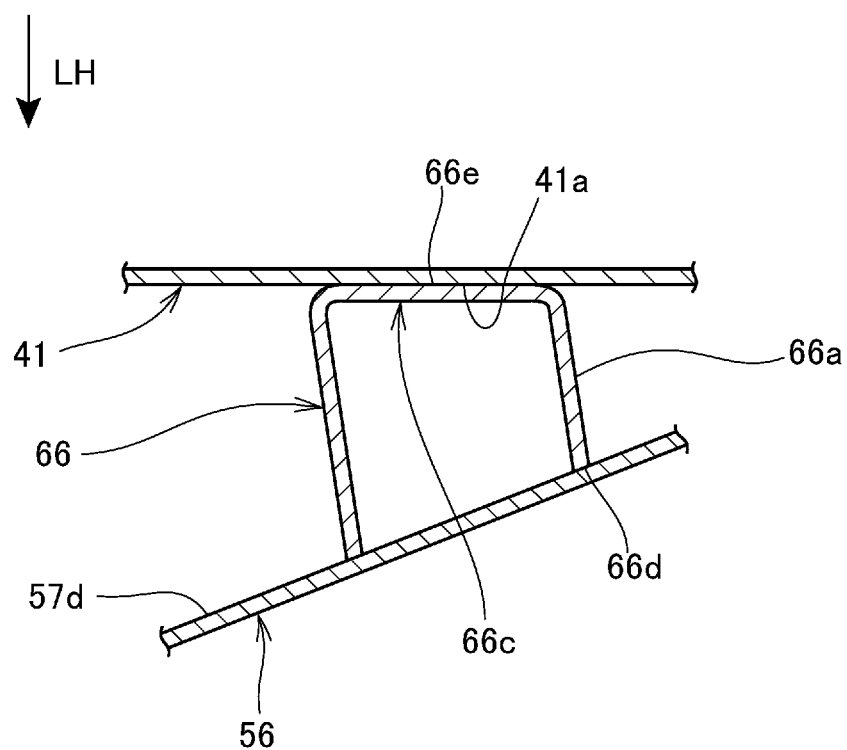
FIG. 5 is a sectional view taken along the V-V line of FIG. 3.

FIG. 5 is a sectional view taken along the V-V line of FIG. 3, which shows a cross section of the first protruding portion 66.

The first protruding portion 66 integrally includes an outer peripheral wall 66*a* joined to a back surface 57*d* of the shroud body 56 and an inner wall 66*c* provided on an inner edge of the outer peripheral wall 66*a* inward in the vehicle width direction to make a hollow structure.

An outer edge 66*d* of the outer peripheral wall 66*a* which is located outward in the vehicle width direction is bonded to the back surface 57*d* of the shroud body 56. The inner wall 66*c* has an abutting surface 66*e* which abuts on an outside surface 41*a* of the radiator 41. The presence of the abutting surface 66*e* can decrease the surface pressure between the outside surface 41*a* of the radiator 41 and the abutting surface 66*e*, thereby suppressing deformation and abrasion of the abutting surface 66*e*.

In addition, since the first protruding portion 66 has a hollow structure, the first protruding portion 66 can be light and highly rigid and highly heat-resistant.

The first protruding portion 66 is made of the same type of CFRP as CFRP of which the shroud body 56 is made, or it is made of CFRP with higher heat resistance than CFRP of which the shroud body 56 is made. The first protruding portion 66 is scarcely affected thermally even though the inner wall 66*c* always contacts the radiator 41 supposed to get hot and it has no problem in terms of strength. The first protruding portion 66 may be made of AFRP as fiber with higher strength and heat resistance than carbon fiber (for example, Kevlar fiber (aramid fiber)) instead of CFRP.

The second protruding portion 67 and third protruding portion 68 shown in FIG. 3 have the same basic structure as the first protruding portion 66, though they are dimensionally different from the first protruding portion 66.

Figure 6:
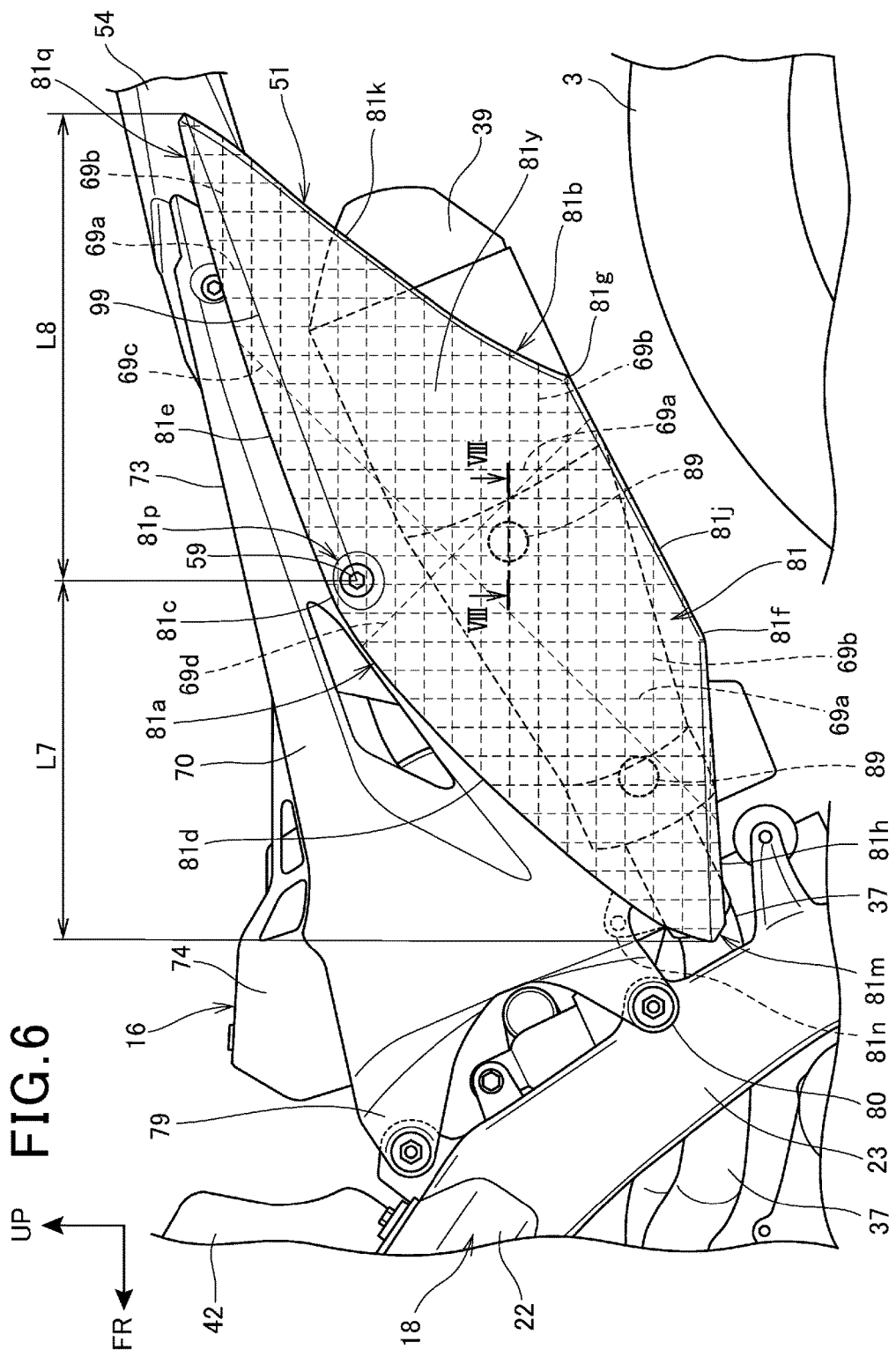
FIG. 6 is a left side view which shows a rear portion of the motorcycle.

FIG. 6 is a left side view which shows a rear portion of the motorcycle 1.

FIG. 6 shows a state in which the seat 13 is removed.

The rear frame 16 is a box-like frame with an inner space and the entire box-like portion is made of fiber-reinforced resin. One example of the FRP of which the rear frame 16 is made is CFRP (carbon fiber-reinforced resin).

The side covers 51, 51 (one of the side covers is only shown in the figure) cover the rear frame 16, the one side muffler 38 (see FIG. 7), and the other side muffler 39 laterally.

The side cover 51 includes a nearly rhombic side cover body 81 in side view and a plurality of protruding portions 89 joined to a back surface of the side cover body 81 by adhesive bonding. A front surface 81*y* of the side cover body 81 is a smooth surface which has no unevenness except an upper fitting portion 81*p* which will be described later.

The side cover body 81 has an upper side 81*a* and a lower side 81*b* in side view and is attached to the rear frame 16 with its longitudinal side inclined rearward and upward.

The upper side 81*a* has an upper side curved portion 81*c* curved in a manner to protrude upward in the center in the longitudinal direction and includes a front upper side 81*d* and a rear upper side 81*e*, in which the front upper side 81*d* extends forward and downward from the upper side curved portion 81*c* and the rear upper side 81*e* extends rearward and upward from the upper side curved portion 81*c*. The lower side 81*b* has a lower side first curved portion 81*f* and a lower side second curved portion 81*g* as two curved portions curved in a manner to protrude downward and includes a front lower side 81*h*, a middle lower side 81*j*, and a rear lower side 81*k*, in which the front lower side 81*h* extends almost parallel forward from the lower side first curved portion 81*f*, the middle lower side 81*j* extends rearward and upward from the lower side first curved portion 81*f*, and the rear lower side 81*k* extends rearward and upward from the lower side second curved portion 81*g*.

The side cover body 81 has a front end portion fitting portion 81*n* at a front end portion 81*m* of the front upper side 81*d* and the upper fitting portion 81*p* under the upper side curved portion 81*c*. The front end portion fitting portion 81*n*, protruding upward, is attached to a front lower portion of the rear frame 16. The upper fitting portion 81*p* is attached to a sidewall 70 of the rear frame 16 with a bolt 59.

A rear end portion 81*q* of the side cover body 81 is a free end not fixed on the vehicle body and located outward of the rear fender 54.

Distance L8 from the upper fitting portion 81*p* to the rear end portion 81*q* in the longitudinal direction is longer than distance L7 from the upper fitting portion 81*p* to the front end portion 81*m* in the longitudinal direction. As known from the above, the rear end portion 81*q* of the side cover body 81 easily warps when an external force is applied from outside in the vehicle width direction.

In addition, since the front end portion fitting portion 81*n* and the upper fitting portion 81*p* are both located near the upper side 81*a* of the side cover body 81, the lower side 81*b* of the side cover body 81 also warps easily.

In this embodiment, the side cover body 81 is made of FRP, for example, CFRP and, its strength is increased in case that an external force is repeatedly applied to the rear end portion 81*q* and lower side 81*b* of the side cover body 81, and further its durability is improved by making it warp easily in consideration of the fiber direction.

CFRP of which the side cover body 81 is made is produced by impregnating the same cloth 69 (see FIG. 9) as that of the shroud body 56 (see FIG. 3) with resin and heating and hardening it.

In the side cover body 81, broken lines extending longitudinally and vertically represent warp thread 69*a* and weft thread 69*b* of carbon fiber. Also, a bisector 69*c* which bisects the angle between the warp thread 69*a* and the weft thread 69*b* is expressed by a broken line.

A bisector 69*d* other than the bisector 69*c* which bisects the angle between the warp thread 69*a* and the weft thread 69*b* is expressed by a broken line. The bisector 69*d* is a line perpendicular to the bisector 69*c*.

The bisectors 69*c* and 69*d* arranged as mentioned above can prevent the rigidity of the side cover body 81 from becoming excessively high in directions along the bisectors 69*c* and 69*d* and enable the side cover body 81 to warp easily in the directions along the bisectors 69*c* and 69*d*. Consequently, even if an external force is repeatedly applied to the side cover body 81, its fatigue strength can be increased.

The protruding portion 89 is located in a manner to overlap the one side muffler 38 and the other side muffler 39 in side view and contact the side surfaces of the one side muffler 38 and the other side muffler 39. The protruding portion 89 is made of heat-resistant resin which does not contain fiber.

Figure 7:
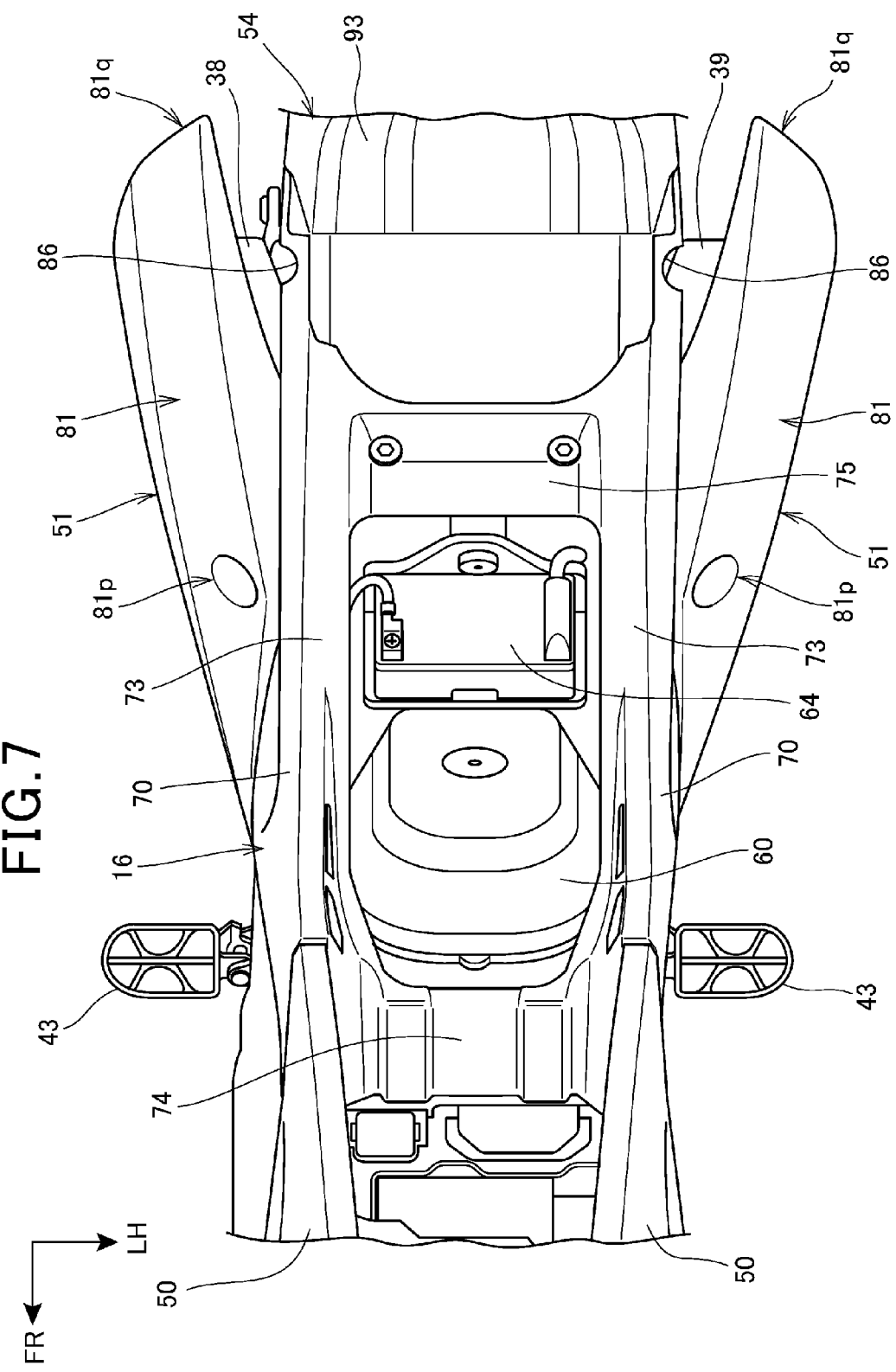
FIG. 7 is a plan view which shows a rear portion of the motorcycle.

FIG. 7 is a plan view which shows a rear portion of the motorcycle 1.

The rear frame 16 includes: a pair of left and right sidewalls 70, 70 spaced from each other in the vehicle width direction; a pair of left and right upper side portions 73, 73 extending from upper edges of the sidewalls 70, 70 inward in the vehicle width direction; a front cross member 74 connecting the upper side portions 73, 73 at the front portion of the rear frame 16 in the vehicle width direction; and a rear cross member 75 connecting the upper side portions 73, 73 at the rear portion of the rear frame 16 in the vehicle width direction.

The sidewalls 70, 70, the upper side portions 73, 73, the front cross member 74, and the rear cross member 75 are made of FRP for example, CFRP.

The left and right sidewalls 70, 70 of the rear frame 16 extend along side edges of the seat 13 (see FIG. 2) in the longitudinal direction.

The left and right side covers 51, 51 gradually expand toward the rear of the vehicle outward in the vehicle width direction and the rear end portion 81*q* of the side cover 51 extends more rearward than the rear end portions of the left and right sidewalls 70, 70 of the rear frame 16 and its distance from the sidewalls 70, 70 and the rear fender 54 gradually increases.

The side covers 51, 51, specifically the rear end portions 81*q*, 81*q* of side cover bodies 81, 81, largely protrude outward in the vehicle width direction, so they are easily subjected to an external force and easily subjected to cyclic load. However, as mentioned above, since they are made of FRP (for example, CFRP), their durability is improved.

FIG. 8 is a sectional view taken along the line of FIG. 6, which shows a cross section of the protruding portion 89.

The protruding portion 89 integrally includes an outer peripheral wall 89*a* joined to a back surface 81*r* of the side cover body 81 and an inner wall 89*c* provided on an inner edge of the outer peripheral wall 89*a* inward in the vehicle width direction to make a hollow structure.

An outer edge 89*d* of the outer peripheral wall 89*a* which is located outward in the vehicle width direction is bonded to the back surface 81*r* of the side cover body 81. The inner wall 89*c* has an abutting surface 89*e* which abuts on an outside surface 39*a* of the other side muffler 39 (or an outside surface of the one side muffler 38 (see FIG. 7)). The presence of the abutting surface 89*e* can decrease the surface pressure between the outside surface 39*a* of the other side muffler 39 (or the outside surface of the one side muffler 38) and the abutting surface 89*e*, thereby suppressing deformation and abrasion of the abutting surface 89*e*. In addition, since the protruding portion 89 has a hollow structure, the protruding portion 89 can be light and highly rigid and highly heat-resistant.

Since the protruding portion 89 is made of heat-resistant resin, it is scarcely affected thermally even though the inner wall 89*c* always contacts the other side muffler 39 (or the one side muffler 38) supposed to get hot.

Figure 9:
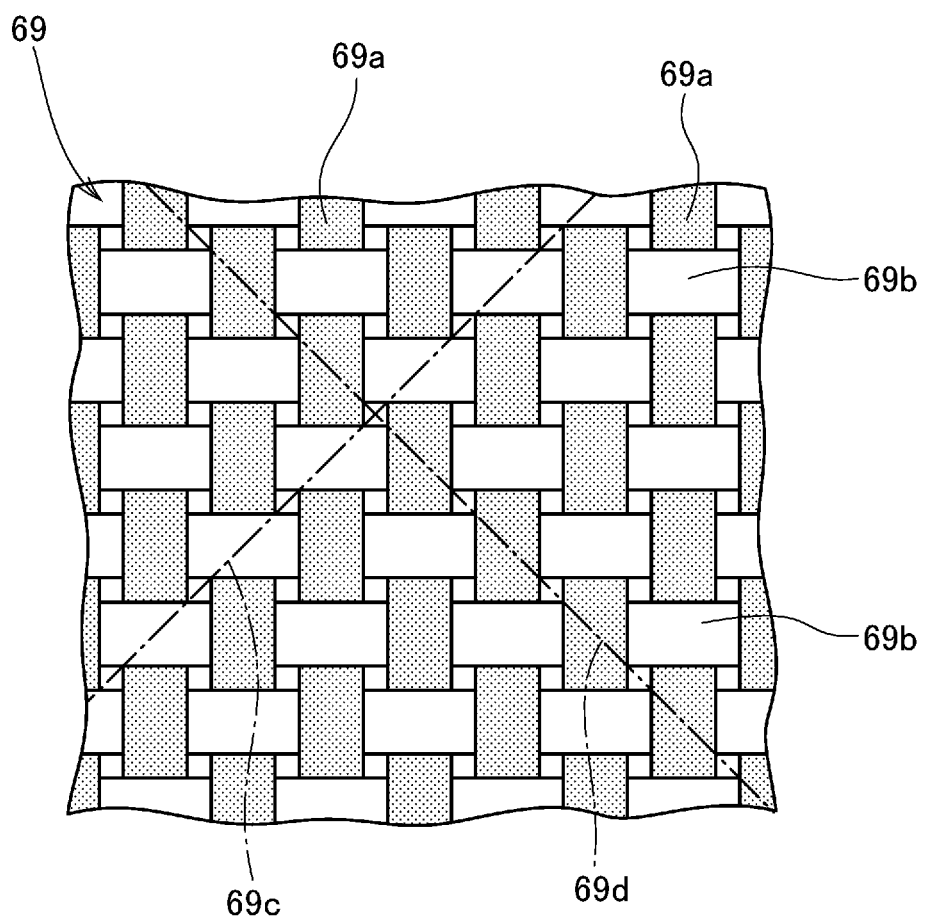
FIG. 9 is a view which shows cloth of FRP (CFRP).

FIG. 9 is a view which shows cloth 69 of FRP (CFRP).

The cloth 69 is plain-woven with warp thread 69*a* and weft thread 69*b* made by bunching fiber (carbon fiber). The angle between the warp thread 69*a* and the weft thread 69*b* is 90 degrees and the bisectors 69*c* and 69*d* which bisect the angle between the warp thread 69a and the weft thread 69b are inclined with respect to the warp thread 69a and the weft thread 69b by 45 degrees. The rigidity is high in the directions in which the warp thread 69a and the weft thread 69b extend, but the rigidity is lower in the directions in which the bisectors 69c and 69d extend than in the directions in which the warp thread 69a and the weft thread 69b extend.

In this embodiment, the durability of the body covers (radiator shroud 50 and side cover 81) is improved by taking advantage of the tendency toward decreased rigidity (tendency toward increased warpability) in the directions in which the bisectors 69c and 69d extend.

Figure 10:
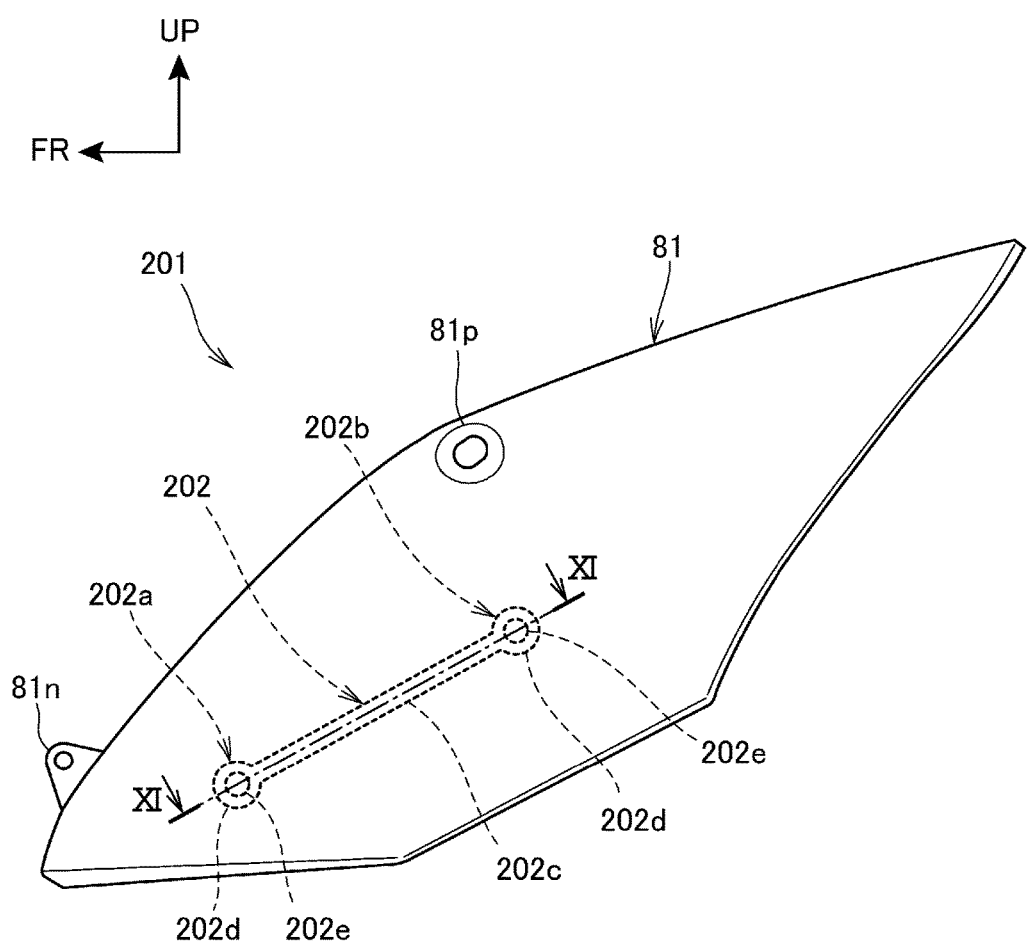
FIG. 10 is a side view which shows a side cover as another embodiment of the body cover.

FIG. 10 is a side view which shows a side cover 201 as another embodiment of the body cover.

The same elements as shown in FIG. 6 are designated by the same reference signs and their detailed description is omitted.

The side cover 201 is different from the side cover 51 only in a protruding portion forming member 202.

Specifically, the side cover 201 as a body cover includes a side cover body 81 and the protruding portion forming member 202 made of resin (for example, nylon resin) joined to the back surface of the side cover body 81 by adhesive bonding. The nylon resin has a high heat resistance and is higher in heat resistance, for example, than the side cover body 81 made of CFRP.

The protruding portion forming member 202 as a protruding portion integrally includes a front protruding portion 202a, a rear protruding portion 202b, and a connecting portion 202c. The inner end portions (distal ends) of the front protruding portion 202a and the rear protruding portion 202b in the vehicle width direction contact outside surfaces of the one side muffler 38 (see FIG. 7) and the other side muffler (see FIG. 7).

The front protruding portion 202a is located rearward of the front end portion fitting portion 81n and forward of the upper fitting portion 81p. The rear protruding portion 202b is located under the upper fitting portion 81p and above the front end portion fitting portion 81n. The connecting portion 202c connects the front protruding portion 202a and the rear protruding portion 202b.

The front protruding portion 202a and the rear protruding portion 202b need not be necessarily located on the side cover body 81 as mentioned above. The important point is that they should be located so as to contact each of the one side muffler 38 and the other side muffler 39 at two points in the longitudinal direction. Also the protruding portion forming member 202 may be structured to have three or more protruding portions with the same shape or almost the same shape as the front protruding portion 202a and the rear protruding portion 202b, in which the protruding portions are integrally connected by a plurality of connecting members.

Figure 11:
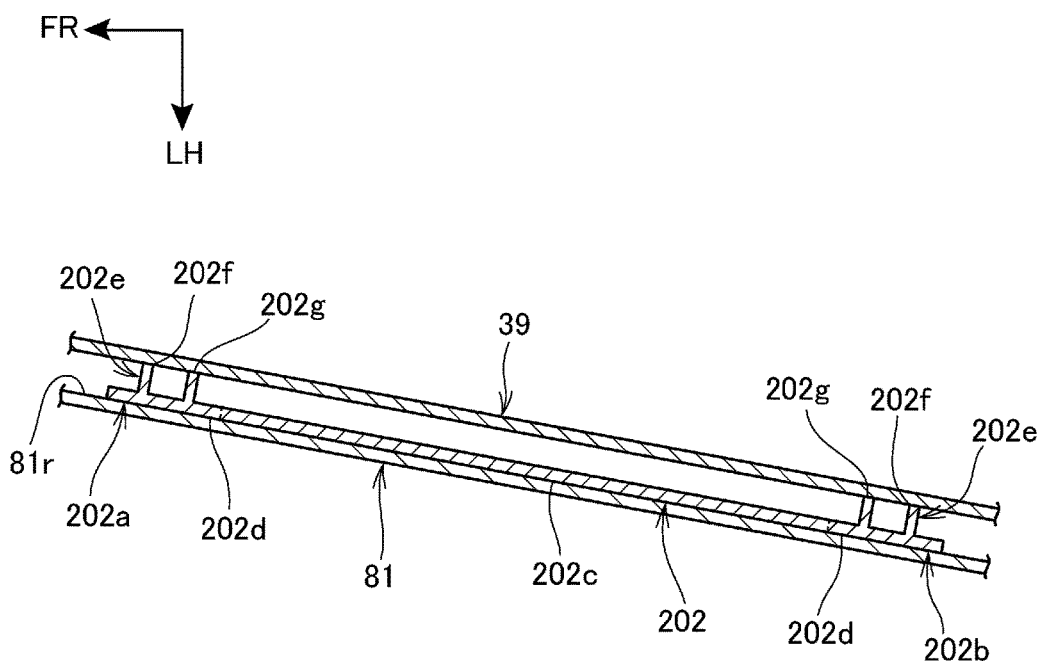
FIG. 11 is a sectional view taken along the XI-XI line of FIG. 10.

FIG. 11 is a sectional view taken along the XI-XI line of FIG. 10.

In FIGS. 10 and 11, the front protruding portion 202a, rear protruding portion 202b, and connecting portion 202c of the protruding portion forming member 202 are bonded to the back surface 81r of the side cover body 81 with an adhesive agent.

The front protruding portion 202a and the rear protruding portion 202b are integrated with a disc-like base portion 202d bonded to the back surface 81r of the side cover body 81 and a circular protruding portion 202e as a cylindrical outer peripheral wall erected from the base portion 202d. The circular protruding portion 202e is hollow and has an opening 202f at an inner end portion (distal end) in the vehicle width direction. A circular abutting surface 202g as a rim of the opening 202f contacts the outside surface of each of the one side muffler 38 and the other side muffler 39 (only the other side muffler 39 is shown in the figure). The circular protruding portion 202e has an outside diameter smaller than the outside diameter of the base portion 202d, and the outer shape of the circular protruding portion 202e and the outer shape of the base portion 202d are concentric or almost concentric.

Since the base portion 202d has an outside diameter larger than the width of the connecting portion 202c, its area bonded to the back surface 81r of the side cover body 81 can be large and it can be bonded firmly. Also, since the circular protruding portion 202e is hollow, the surface area available for heat radiation can be larger than when it is solid and thus heat radiation performance can be improved.

The connecting portion 202c is a plate-like portion and can lump a plurality of protruding portions (front protruding portion 202a and rear protruding portion 202b) and assemble them on the side cover body 81. Therefore, the number of assembling steps can be decreased and the positioning accuracy can be improved in assembling the protruding portions (front protruding portion 202a and rear protruding portion 202b).

As shown in FIGS. 3, 5, 6, and 8, in the body cover structure of the motorcycle 1 (see FIG. 1) as a saddle riding vehicle having the radiator should 50 and side cover 51, 201 as body covers of fiber-reinforced resin to cover an outside of the vehicle body, the radiator should 50 and side cover 51, 201, which externally cover the engine 10 or components supposed to get hot relating to the engine 10 (one side muffler 38 (see FIG. 7), the other side muffler 39, and the radiator 41) have protruding portions (first protruding portion 66, second protruding portion 67, protruding portion 89, and protruding portion forming member 202) inside them. The first protruding portion 66, second protruding portion 67, protruding portion 89, and protruding portion forming member 202 have abutting surfaces 66e, 89e, and 202g to abut on the engine 10 or the components supposed to get hot relating to the engine 10 (one side muffler 38 (see FIG. 7), the other side muffler 39, and the radiator 41), at their distal ends. The first protruding portion 66, second protruding portion 67, protruding portion 89, and protruding portion forming member 202 are made of resin material with higher heat resistance than the shroud body 56 and side cover body 81 as cover members which constitute the radiator shroud 50 and side cover 51, 201.

According to this structure, the first protruding portion 66, second protruding portion 67, protruding portion 89, and protruding portion forming member 202 can be highly heat-resistant. Also, since the first protruding portion 66 and second protruding portion 67 have abutting surfaces 66e, the protruding portion 89 has an abutting surface 89e, and the protruding portion forming member 202 has an abutting surface 202g, the surface pressures generated on the abutting surfaces 66e, 89e, and 202g can be decreased. Therefore, thermal influence on the first protruding portion 66, second protruding portion 67, and protruding portion 89 and their deformation or abrasion can be suppressed.

In addition, while the first protruding portion 66, second protruding portion 67, protruding portion 89, and protruding portion forming member 202 abut on the components supposed to get hot relating to the engine, the first protruding portion 66, second protruding portion 67, protruding portion 89, and protruding portion forming member 202 can be made of resin and integrated with the radiator shroud 50 and the side cover 51, 201, so the structure can be simple, compact, and light. Furthermore, the cost can be lower than in the case that the entire shroud body 56 of the radiator shroud 50 and the entire side cover body 81 of the side cover 51, 201 are made of resin material with high heat resistance.

In addition, as shown in FIGS. 3, 5, 6 and 8, the first protruding portion 66, second protruding portion 67, and protruding portion 89 are made hollow with the outer peripheral walls 66a, 89a erected from the shroud body 56 of the radiator shroud 50 and the side cover body 81 of the side cover 51 and the inner walls 66c, 89c at the top of the outer peripheral walls 66a, 89a, and have abutting surfaces 66e, 89e formed on the inner walls 66c, 89c.

According to this structure, the first protruding portion 66, second protruding portion 67, and protruding portion 89 can be not only light but also have higher rigidity and higher heat resistance. Consequently, the radiator shroud 50 and the side cover 51 can be light and also, if an external force is applied to the radiator shroud 50 and the side cover 51, deformation of the first protruding portion 66, second protruding portion 67, and protruding portion 89 can be suppressed and further they can be less susceptible to thermal influence.

As shown in FIG. 3, the body cover is the radiator shroud 50 which covers an outside of the radiator 41 and the first protruding portion 66 and second protruding portion 67 abut on the outside surface of the radiator 41. According to this structure, even if the first protruding portion 66 and second protruding portion 67 of the radiator shroud 50 contact the outside surface of the radiator 41 which is hot, they can resist the high temperature of the radiator 41.

In addition, as shown in FIG. 6, the body cover is the side cover 51 which is located under the lateral portion of the seat 13 to cover an outside of the one side muffler 38 (see FIG. 7) or the other side muffler 39 as a muffler, and the protruding portion 89 abuts on the outside surface of the one side muffler 38 or the other side muffler 39. According to this structure, even if the protruding portion 89 of the side cover 51 contacts the outside surface of the one side muffler 38 or other side muffler 39 which is hot, it can resist the high temperature of the one side muffler 38 or other side muffler 39.

As shown in FIG. 3, the first protruding portion 66 and second protruding portion 67 are made of fiber-reinforced resin and the fiber of the first protruding portion 66 and second protruding portion 67 is higher in strength and heat resistance than the fiber of the shroud body 56 of the radiator shroud 50. According to this structure, the first protruding portion 66 and second protruding portion 67 can have high strength and high heat resistance and the cost can be lower than in the case that the entire radiator shroud 50 has high strength and high heat resistance.

In addition, the fiber of the shroud body 56 of the radiator shroud 50 is carbon fiber and the fiber of the first protruding portion 66 and second protruding portion 67 is Kevlar fiber. According to this structure, the first protruding portion 66 and second protruding portion 67 can have not only high heat resistance but also high strength.

In addition, as shown in FIGS. 3, 5, 6, and 8, in the body cover structure of the motorcycle 1 (see FIG. 1) having the radiator should 50 and the side cover 51, 201 as body covers of resin to cover an outside of the vehicle body, the radiator shroud 50 and side cover 51, 201, the protruding portions (first protruding portion 66, second protruding portion 67, protruding portion 89, protruding portion forming member 202) are separate components from the shroud body 56 and side cover body 81 which constitute the radiator shroud 50 and the side cover 51, 201, and the first protruding portion 66, second protruding portion 67, protruding portion 89, and protruding portion forming member 202 are made of resin material with high heat resistance. The first protruding portion 66, second protruding portion 67, protruding portion 89, and protruding portion forming member 202 have, at their distal ends, the abutting surfaces 66e, 89e, 202g as abutting portions which directly abut on the engine 10 or the components supposed to get hot relating to the engine 10 (one side muffler 38 (see FIG. 7), other side muffler 39, radiator 41).

According to this structure, the first protruding portion 66, second protruding portion 67, protruding portion 89, and protruding portion forming member 202 can have high heat resistance. Also, since the first protruding portion 66 and second protruding portion 67 have abutting surfaces 66e for direct contact, the protruding portion 89 has an abutting surface 89e for direct contact, and the protruding portion forming member 202 has an abutting surface 202g for direct contact, it is only necessary to increase the heat resistance of the abutting surfaces 66e, 89e, 202g and the structure can be simple and compact.

In addition, the surface pressure generated on the first protruding portion 66, second protruding portion 67, protruding portion 89, and protruding portion forming member 202 can be decreased.

Therefore, thermal influence on the first protruding portion 66, second protruding portion 67, and protruding portion 89 and their deformation or abrasion can be suppressed.

The above embodiment is just one embodiment of the present invention and it may be modified or applied arbitrarily without departing from the gist of the present invention.

For example, in the above embodiment, the protruding portion 89 shown in FIG. 8 is made of resin containing no fiber; however, instead it may be made of fiber-reinforced resin.

Also, although the same cloth 69 (see FIG. 9) is used as the CFRP of the radiator shroud 50 and side cover 51 shown in FIGS. 3 and 6, instead different types of cloth (for example, fibers different in thickness and weaving method) may be used for the radiator shroud 50 and the side cover 51.

Instead of the above CFRP forming method, another forming method may be adopted. Also, although this embodiment employs CFRP, instead FRP (fiber-reinforced resin) using another type of fiber may be employed.

Furthermore, the present invention may be applied not only to the motorcycle 1 but also to saddle riding vehicles other than the motorcycle 1. Here, "saddle riding vehicles" include all vehicles in which a rider straddles a vehicle body and refer to not only motorcycles (including motorized bicycles) but also three-wheeled vehicles and four-wheeled vehicles classified as ATVs (all-terrain vehicles).

REFERENCE SIGNS LIST

1 . . . Motorcycle (saddle riding vehicle)
10 . . . Engine
13 . . . Seat
38 . . . One side muffler (component supposed to get hot relating to engine, muffler)
39 . . . Other side muffler (component supposed to get hot relating to engine, muffler)
41 . . . Radiator (component supposed to get hot relating to engine)
50 . . . Radiator shroud (body cover)
51, 201 . . . Side cover (body cover)
56 . . . Shroud body (cover body which constitutes a body cover)

66 . . . First protruding portion (protruding portion)
66a, 89a . . . Outer peripheral wall
66c, 89c . . . Inner wall
66e, 89e, 202g . . . Abutting surface (abutting portion)
67 . . . Second protruding portion (protruding portion)
81 . . . Side cover body (cover body which constitutes a body cover)
89 . . . Protruding portion
202 . . . Protruding portion forming member (protruding portion)
202e . . . Circular protruding portion (outer peripheral wall)

The invention claimed is:

1. A body cover structure for a saddle riding vehicle, said body cover structure comprising:
a body cover made of fiber-reinforced resin, for covering an outside of a vehicle body,
a protruding portion provided inside the body cover covering an outside of an engine or a first component supposed to get hot, the first component relating to the engine; and
an abutting surface provided at a distal end of the protruding portion, said abutting surface being a flat surface and abutting on an outside surface of the engine or the first component,
wherein:
a back surface of a cover body, constituting the body cover, is inclined with respect to the outside surface of the engine or the first component,
the protruding portion has a hollow structure formed by two outer peripheral walls extending from the back surface of the cover body, and an inner wall provided at the distal end of the protruding portion, and the abutting surface is formed on the inner wall,
portions of the outer peripheral walls which face toward each other are parallel to each other,
the outer peripheral walls are inclined with respect to the outside surface of the engine or the first component and the back surface of the cover body, and
the outer peripheral walls and the inner wall of the protruding portion are made of resin material with higher heat resistance than the cover body constituting the body cover.

2. The body cover structure for the saddle riding vehicle according to claim 1, wherein the body cover is a radiator shroud for covering an outside of a radiator, and the protruding portion abuts on an outside surface of the radiator.

3. The body cover structure for the saddle riding vehicle according to claim 1, wherein the body cover is a side cover located under a lateral portion of a seat, the side cover covering an outside of a muffler, and the protruding portion abuts on an outside surface of the muffler.

4. The body cover structure for the saddle riding vehicle according to claim 1, wherein the protruding portion is made of fiber-reinforced resin, and a fiber of the protruding portion has higher strength and higher heat resistance than a fiber of a resin member of the body cover.

5. The body cover structure for the saddle riding vehicle according to claim 4, wherein the fiber of the resin member of the body cover is carbon fiber, and the fiber of the protruding portion is Kevlar fiber.

6. A body cover structure for a saddle riding vehicle, said body cover structure comprising:
a body cover made of fiber-reinforced resin for covering an outside of a vehicle body,
a protruding portion provided inside the body cover covering an outside of an engine or a first component supposed to get hot, the first component relating to the engine; the protruding portion being configured as a separate component from a cover body constituting the body cover, the protruding portion being made of resin material with high heat resistance, and
an abutting portion formed with a flat surface and provided at a distal end of the protruding portion to directly abut on an outside surface of the engine or the first component,
wherein:
a back surface of the cover body is inclined with respect to the outside surface of the engine or the first component,
the protruding portion has a hollow structure formed by two outer peripheral walls, extending from the back surface of the cover body, and an inner wall provided at distal end portions of the outer peripheral walls, and the abutting surface is formed on the inner wall,
portions of the outer peripheral walls, which face toward each other are parallel to each other,
the outer peripheral walls are inclined with respect to the outside surface of the engine or the first component and the back surface of the cover body, and
the outer peripheral walls and the inner wall of the protruding portion are made of resin material with higher heat resistance than the cover body.

7. The body cover structure for the saddle riding vehicle according to claim 1, wherein the body cover is a radiator shroud for covering an outside of a radiator, and the protruding portion abuts on an outside surface of the radiator.

8. The body cover structure for the saddle riding vehicle according to claim 1, wherein the body cover is a side cover located under a lateral portion of a seat, the side cover covering an outside of a muffler, and the protruding portion abuts on an outside surface of the muffler.

9. The body cover structure for the saddle riding vehicle according to claim 1, wherein the protruding portion is made of fiber-reinforced resin, and a fiber of the protruding portion has higher strength and higher heat resistance than a fiber of a resin member of the body cover.

10. The body cover structure for the saddle riding vehicle according to claim 2, wherein the protruding portion is made of fiber-reinforced resin, and a fiber of the protruding portion has higher strength and higher heat resistance than a fiber of a resin member of the body cover.

11. The body cover structure for the saddle riding vehicle according to claim 3, wherein the protruding portion is made of fiber-reinforced resin, and a fiber of the protruding portion has higher strength and higher heat resistance than a fiber of a resin member of the body cover.

12. The body cover structure for the saddle riding vehicle according to claim 4,
wherein the fiber-reinforced resin is formed of a cloth woven with warp threads and weft threads formed of fibers,
and wherein the protruding portion is disposed so that the warp threads are aligned substantially along a longitudinal direction in which the protruding portion extends in the back surface of the cover body.

* * * * *